(12) United States Patent
Tramoni

(10) Patent No.: US 11,863,248 B2
(45) Date of Patent: *Jan. 2, 2024

(54) PRIORITY MANAGEMENT FOR A TRANSPONDER

(71) Applicant: STMicroelectronics (Rousset) SAS, Rousset (FR)

(72) Inventor: Alexandre Tramoni, Le Beausset (FR)

(73) Assignee: STMicroelectronics (Rousset) SAS, Rousset (FR)

(*) Notice: Subject to any disclaimer, the term of this patent is extended or adjusted under 35 U.S.C. 154(b) by 0 days.

This patent is subject to a terminal disclaimer.

(21) Appl. No.: 18/159,813

(22) Filed: Jan. 26, 2023

(65) Prior Publication Data

US 2023/0170935 A1   Jun. 1, 2023

Related U.S. Application Data

(63) Continuation of application No. 16/996,563, filed on Aug. 18, 2020, now Pat. No. 11,595,082.

(30) Foreign Application Priority Data

Aug. 30, 2019   (FR) ..................................... 1909585

(51) Int. Cl.
    *H04B 5/00*   (2006.01)

(52) U.S. Cl.
    CPC ......... *H04B 5/0031* (2013.01); *H04B 5/0043* (2013.01); *H04B 5/0062* (2013.01); *H04B 5/0087* (2013.01)

(58) Field of Classification Search
    CPC .. H04B 5/0031; H04B 5/0043; H04B 5/0062; H04B 5/0087; H04B 5/0025; H04B 5/0068
    USPC ........................................................ 455/41.1
    See application file for complete search history.

(56) References Cited

U.S. PATENT DOCUMENTS

| 11,595,082 | B2* | 2/2023 | Tramoni ............. H04B 5/0025 |
| 2010/0279606 | A1 | 11/2010 | Hillan et al. |
| 2012/0149301 | A1 | 6/2012 | Wiley |
| 2014/0256248 | A1 | 9/2014 | Cargill et al. |
| 2014/0269881 | A1 | 9/2014 | He et al. |
| 2015/0044964 | A1 | 2/2015 | Khan et al. |
| 2017/0133885 | A1 | 5/2017 | Chen |
| 2017/0201945 | A1 | 7/2017 | Chae et al. |
| 2017/0351355 | A1 | 12/2017 | Hsieh |

(Continued)

FOREIGN PATENT DOCUMENTS

| CN | 102318216 A | 1/2012 |
| CN | 103270703 A | 8/2013 |
| CN | 106453843 A | 2/2017 |

(Continued)

*Primary Examiner* — Eugene Yun
(74) *Attorney, Agent, or Firm* — Slater Matsil, LLP

(57) ABSTRACT

A device includes a first circuit that includes a near-field emission circuit, a second circuit, and a hardware connection linking the first circuit to the second circuit. The hardware connection is dedicated to a priority management between the first circuit and the second circuit. In addition, priority management information can be communicated between a near-field emission circuit and a second circuit. The communicating occurs between a dedicated hardware connection connecting the near-field emission circuit to the second circuit.

20 Claims, 4 Drawing Sheets

(56) References Cited

U.S. PATENT DOCUMENTS

2019/0070970 A1 3/2019 Chan et al.
2019/0311680 A1 10/2019 Koo et al.

FOREIGN PATENT DOCUMENTS

| CN | 106537800 A | 3/2017 |
| CN | 107209593 A | 9/2017 |
| CN | 108038532 A | 5/2018 |
| WO | 2016137466 A1 | 9/2016 |

* cited by examiner

PRIORITY MANAGEMENT FOR A TRANSPONDER

CROSS-REFERENCE TO RELATED APPLICATIONS

This application is a continuation application of U.S. patent application Ser. No. 16/996,563, filed on Aug. 18, 2020, which claims the benefit of French Patent Application No. 1909585, filed on Aug. 30, 2019, which applications are hereby incorporated by reference herein in their entirety.

TECHNICAL FIELD

The present disclosure relates generally to priority management for a transponder.

BACKGROUND

Electromagnetic transponder communication systems are increasingly common, in particular, since the development of near field communication (NFC) technologies. These systems use a radiofrequency electromagnetic field generated by a device (terminal or reader) to communicate with another device (card).

An emission of such an electromagnetic field by an NFC device can sometimes disrupt other functions implemented by the NFC device. In the case, for example, of a mobile telephone including an NFC circuit, the field emission is typically able to interfere with the refreshing of a primary screen of the telephone.

SUMMARY

The present disclosure relates generally to electronic circuits such as electromagnetic transponders. Particular embodiments relate to electronic devices incorporating a near field communication (NFC) circuit.

Embodiments can prevent the near field emission of an NFC device from disrupting other functions carried out by the device.

An embodiment addresses all or some of the drawbacks of known NFC devices.

An embodiment provides a device that includes a first near-field emission circuit, a second circuit and a hardware connection linking, preferably connecting, the first circuit to the second circuit. The connection is dedicated to a priority management between the first circuit and the second circuit.

An embodiment provides a method in which a physical connection of a device linking, preferably connecting, a first near-field emission circuit to a second circuit is dedicated to a priority management between the first circuit and the second circuit.

According to an embodiment, the priority management is suitable for preventing a near-field emission by the first circuit.

According to an embodiment, the second circuit is a microcontroller.

According to an embodiment, the second circuit is an ultra-wideband communication circuit.

According to an embodiment, the connection conveys a first binary signal for inhibiting one of the two circuits, transmitted by the other of the two circuits.

According to an embodiment, the first signal is transmitted to the first circuit during a refresh of a screen.

According to an embodiment, the first signal is transmitted to the first circuit during a radiofrequency emission controlled by the second circuit.

According to an embodiment, the first signal is processed by software.

According to an embodiment, the first signal is processed by a finite state machine by cabled software belonging to the first circuit.

According to an embodiment, the connection conveys a second binary state signal of one of the two circuits, transmitted by the other of the two circuits.

According to an embodiment, the connection includes a first conductor dedicated to a transmission from the first circuit to the second circuit and a second conductor dedicated to a transmission from the second circuit to the first circuit.

According to an embodiment, one of the two conductors conveys the first signal and the other conductor conveys the second signal.

An embodiment provides a mobile telephone configured to carry out the method as described.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 3, show timing diagrams of embodiments of methods for controlling the device described in relation with FIG. 2;

FIG. 7, show timing diagrams of the control method described in relation with FIG. 6.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the generation of the radio frequency signals and their interpretation have not been described in detail, the described embodiments and modes of implementation being compatible with the standard techniques for generating and interpreting these signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures, with the understanding that, in practice, the described devices can be oriented differently.

Unless specified otherwise, the expressions "around," "approximately," "substantially" and "in the order of" signify within 10%, and preferably within 5%.

In the following description, a "binary signal" refers to a signal that alternates between a first state or constant level, for example a low state, denoted "0," and a second state or constant level, for example a high state, denoted "1". The binary signals can, in practice, correspond to voltages or currents that may not be perfectly constant in the high or low state.

Figure 1:
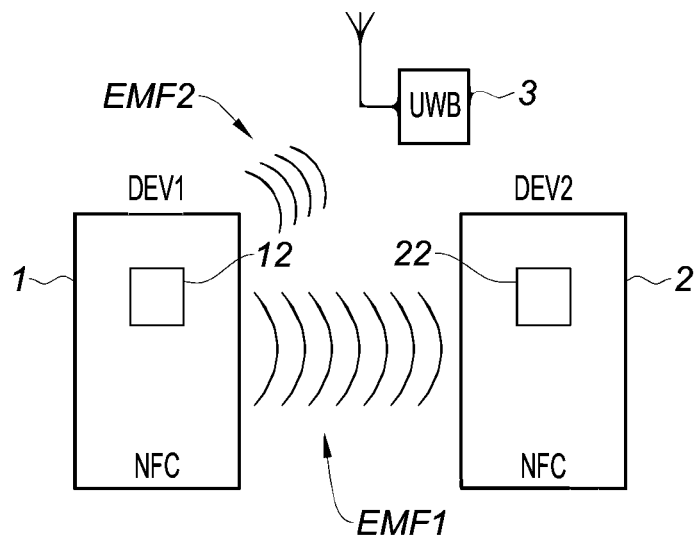
FIG. 1 shows, very schematically and in block diagram form, an exemplary system of the type to which, as an example, the described embodiments apply.

FIG. 1 shows, very schematically and in block diagram form, an exemplary system of the type to which, as an example, the described embodiments apply.

The case is considered of two similar electronic devices, for example two mobile telephones, but everything that will be described applies more generally to any system in which a reader, terminal or device, must detect and communicate with an electromagnetic transponder or an electronic tag (TAG). To simplify, reference will be made to NFC devices in order to designate electronic devices incorporating near field communication circuits.

Two NFC devices 1 (DEV1) and 2 (DEV2) are able to communicate by near field electromagnetic coupling. Depending on the applications, for a communication, one of the devices operates in so-called reader mode, while the other operates in so-called card mode, or both devices communicate in peer-to-peer (P2P) mode. Each device includes various electronic circuits 12 and 22 for generating and/or detecting a radiofrequency signal using an antenna (not shown). The radiofrequency field generated by one of the devices is detected by the other device, which is within range.

When a device (for example, the device 1) transmits an electromagnetic field (EMF1) in order to initiate a communication with another NFC device (for example, the device 2), this field is detected by this device 2 once it is within range. The coupling between the two oscillating circuits (that of the antenna of the device 2 and that of the antenna of the device 1) is reflected by a variation of the charge made up of the circuits of the device 2 on the oscillating circuit for generating the field of the device 1. In practice, for a communication, the corresponding phase or magnitude variation of the transmitted field is detected by the device 1, which then begins an NFC communication protocol with the device 2. On the device 1 side, in practice it is detected whether the magnitude of the voltage across the terminals of the oscillating circuit and/or the phase shift relative to the signal generated by the circuit 12 depart from the magnitude and phase windows each defined by a lower threshold and an upper threshold.

When the device 1 detects the presence of the device 2 in its field, it begins a procedure for establishing communication, implementing transmissions of the requests by the device 1 and responses by the device 2 (polling sequence as defined in the NFC Forum standard). If circuits of the device 2 are in standby mode, they are then reactivated.

For energy saving reasons, the transmitting device 1, whether it is connected to the electrical distribution sector or supplied directly or indirectly by battery, is placed in standby mode when it is not in use for communication. NFC devices are generally equipped with circuits for detecting another device located within their field in order to exit standby mode for communication purposes.

In certain applications, when an NFC device is not in the process of communicating, it is switched to so-called low power mode in order to reduce the consumed energy. This is in particular the case for battery-powered devices. In this low power mode, a device configured in reading mode executes a so-called tag detection or card detection mode and executes detection loops. The detection is similar to that done when the device is not in low power mode, but the difference is that, in normal mode, the transmission of the carrier is continuous and periodically includes polling frames whereas, in order to reduce consumption, the transmission of the field is done by periodic bursts and without polling frame when the device is in low power mode. The bursts have a significantly shorter duration (in a ratio of at least ten, preferably at least one hundred) than the duration of a polling request of a card in normal mode.

When it is in low power mode, an NFC device capable of operating both in reader mode and in card mode alternates between field emission phases and field detection phases. The field emission phases serve to detect the presence of a device in card mode within range. The field detection phases allow the device to detect any presence of a field emitted by another device in reader mode located within range.

The near field communication circuits are increasingly frequently integrated into devices having communication functions other than NFC. This is in particular the case for mobile telephones that incorporate mobile telephone circuits and functions and NFC circuits and functions, and most often also Wi-Fi, Bluetooth, etc. functions and circuits. Laptop computers they constitute another example of NFC devices while having Wi-Fi, Bluetooth, etc. circuits and functions.

In FIG. 1, it is presumed that the device 1 emits, aside from the electromagnetic field EMF1 suitable for establishing a communication with the device 2, another radiofrequency electromagnetic field (EMF2) configured to convey signals intended for an ultra-wideband (UWB) receiver 3.

In some cases, the field emission by an NFC device is then problematic because it disrupts the ultra-wideband communication. Such disruptions can occur for other functions implemented by the NFC device, in particular by a refresh process for a screen of the NFC device.

The embodiments implemented below seek to resolve these problems of disruptions due to the field emission.

Figure 2:
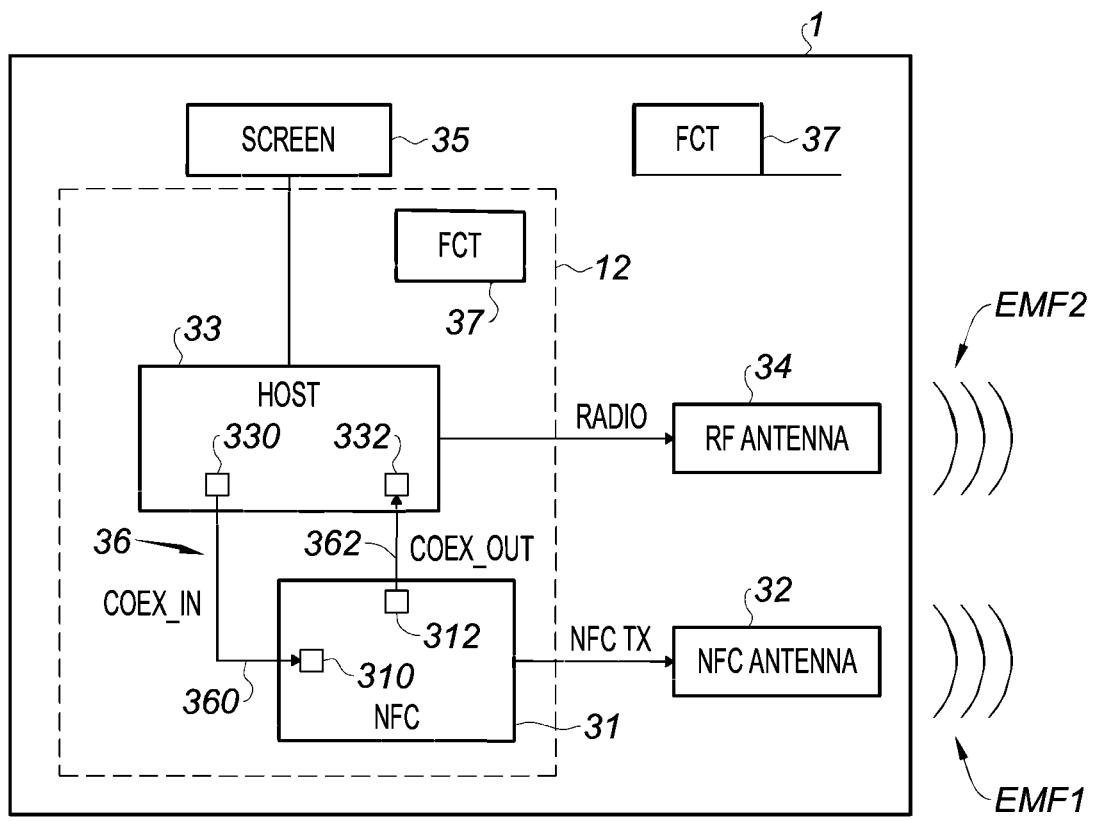
FIG. 2 shows, very schematically and in block diagram form, an embodiment of a near field communication device.

FIG. 2 shows, very schematically and in block diagram form, an embodiment of a near field communication device, for example the device 1 of FIG. 1.

According to this embodiment, the device 1, or its circuit 12, includes a first circuit 31 (NFC), for example a near field communication circuit, linked, preferably connected, to a first antenna 32 (NFC ANTENNA), for example a near field communication antenna. A first signal, denoted NFC TX, makes it possible to control a field emission by the first near field communication antenna 32. The signal NFC TX is transmitted from the first circuit 31 to the first antenna 32, and causes the emission of the electromagnetic field EMF1 by the first antenna 32.

The device 1, or its circuit 12, further includes a second circuit 33 (HOST). This second circuit 33 is for example a microcontroller, a microprocessor or an ultra-wideband communication circuit of the device 1. The second circuit 33 here is linked, preferably connected, to a second radiofrequency communication antenna 34 (RF ANTENNA). A second signal, denoted RADIO, makes it possible to control a transmission of a radiofrequency signal by using the second antenna 34. The signal RADIO is transmitted from the second circuit 33 to the second antenna 34, and causes the emission of the electromagnetic field EMF2 by the second antenna 34.

The second circuit 33 is further linked, preferably connected, to a screen 35 (SCREEN), for example a primary display screen of the device 1. It is assumed that the second circuit 33 manages a refresh of the screen 35. In other words, it is assumed that the second circuit 33 causes, periodically, an update of display pixels of the screen 35.

According to this embodiment, the second circuit 33 is linked, preferably connected, to the first NFC circuit 31 by a physical connection 36. The connection 36 includes a first conductor 360 and a second conductor 362 linking, preferably connecting, terminals of the first circuit 31 to terminals of the second circuit 33.

More specifically, as illustrated in FIG. 2, the first conductor 360 links, preferably connects, a first output terminal 330 of the second circuit 33 to a first input terminal 310 of the first circuit 31. The second conductor 362 links, preferably connects, a second output terminal 312 of the first circuit 31 to a second input terminal 332 of the second circuit 33.

The terminals 310, 312, 330 and 332 are for example general purpose input/output (GPIO) terminals of the circuits 31 and 33. If applicable, the terminals 312 and 330 are configured as outputs and the terminals 30 and 332 are configured as inputs.

The first conductor 360 is dedicated to a transmission, from the circuit 33 to the circuit 31, of a third signal, denoted COEX_IN. The second conductor 362 is dedicated to a transmission, from the circuit 31 to the circuit 33 of a fourth signal, denoted COEX_OUT. According to this embodiment, the signals COEX_IN and COEX_OUT are binary signals respectively switched by the second circuit 33 and by the first circuit 31.

The signals COEX_IN and COEX_OUT respectively make it possible to give priority either to operations carried out by the circuit 31, or to operations carried out by the second circuit 33. In particular, the signals COEX_IN and COEX_OUT, exchanged between the circuits 31 and 33, make it possible to ensure that the emission of the electromagnetic field EMF1 by the first circuit 31, on the one hand, and the emission of the electromagnetic field EMF2 or the refresh of the screen 35 by the second circuit 33, on the other hand, are not done simultaneously.

The device 1 can also include one or several other electronic elements or circuits. These electronic elements or circuits, the operation of which will not be described in detail in the description below, are symbolized in FIG. 2 by functional blocks 37 (FCT).

Figure 3A:
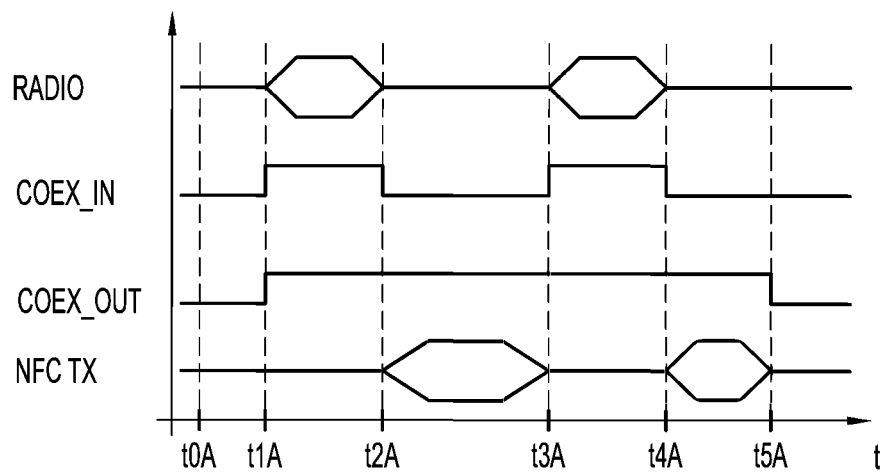
FIGS. 3A-3C, collectively
Figure 3B:
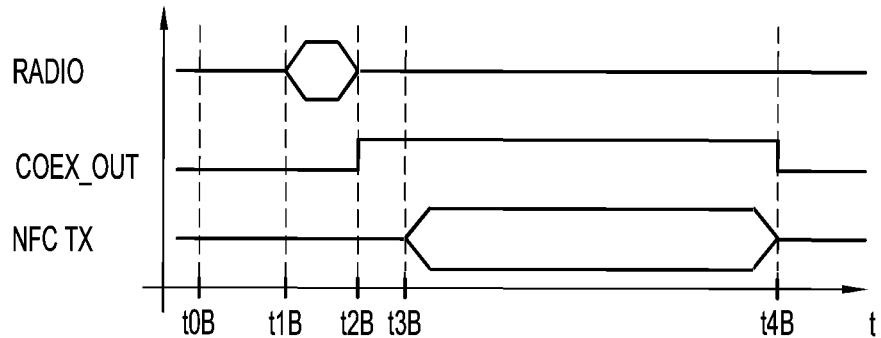
Figure 3C:
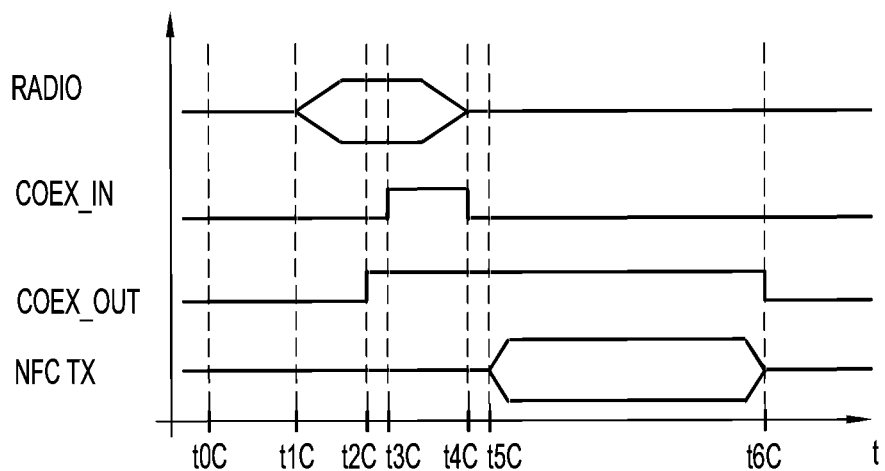

FIGS. 3A-3C show timing diagrams of embodiments of methods for controlling the device described in relation with FIG. 2. These timing diagrams in particular reflect evolution examples, as a function of time (t), of the signals RADIO, COEX_IN, COEX_OUT and NFC TX.

In view A, the timing diagram illustrates an embodiment in which the priority is given to the emission of the field EMF2 by the second circuit 33. The second circuit 33 here serves as priority circuit. According to this embodiment, the signal COEX_IN serves as inhibiting signal of the first circuit 31. In particular, the signal COEX_IN here is configured to prevent a near field emission by the first circuit 31. The signal COEX_OUT then serves as state signal of the first circuit 31. In particular, the signal COEX_OUT here is configured to transmit, to the second circuit 33, a near field emission request by the first circuit 31.

According to the embodiment of view A, it is considered that: a low state of the signal COEX_IN indicates that the first circuit 31 is authorized to emit in near field; a high state of the signal COEX_IN indicates that the first circuit 31 is prohibited from emitting in near field; a low state of the signal COEX_OUT indicates that the first circuit 31 does not wish to emit or is not emitting in near field; and a high state of the signal COEX_OUT indicates that the first circuit 31 wishes to emit or is emitting in near field.

At an instant t0A, the signals RADIO, COEX_IN, COEX_OUT and NFC TX are idle. In particular, the signals NFC TX and RADIO are in a state such that they do not lead to any field emission by the antennas 32 and 34, respectively. The binary signals COEX_IN and COEX_OUT are both in a low state or level. According to this embodiment, this means that the first circuit 31 is allowed to emit in near field, but does not wish to emit.

At an instant t1A, after instant t0A, it is assumed that emission controls simultaneously reach the first circuit 31 and the second circuit 33. At instant t1A, the first circuit 31 therefore switches its signal COEX_OUT from the low state to a high state or level. This switching of the signal COEX_OUT aims to signify, to the second circuit 33, that the first circuit 31 wishes to begin a near field emission.

However, in the embodiment of view A, the emission of the second circuit 33 takes priority relative to the emission of the first circuit 31. The second circuit 33 therefore prevents the first circuit 31 from emitting in near field. To that end, the second circuit 33 switches, at instant t1A, the signal COEX_IN from the low state to a high state or level. The second circuit 33 begins sending the signal RADIO. During this time, the signal NFC TX is kept idle.

At an instant t2A, after instant t1A, the second circuit 33 completes transmission. The signal RADIO is brought back to the idle state. The signal COEX_IN is then switched to the low state. This indicates that the first circuit 31 is authorized to emit in near field. The signal COEX_OUT is still in the high state at instant t2A, which therefore indicates that the first circuit 31 is prepared to emit. The emission of the signal NFC TX can then begin.

It is presumed that at an instant t3A, after instant t2A, the second circuit 33 wishes to emit again. The second circuit 33 then switches the signal COEX_IN to the high state. This interrupts the near field emission by the first circuit 31. The signal NFC TX is then placed in the idle state while the second circuit 33 emits.

At an instant t4A, after instant t3A, the emission of the second circuit 33 ceases. The signal COEX_IN is switched to the low state. The signal COEX_OUT is then still in the high state. The emission of the first circuit 31 can therefore resume.

At an instant t5A, after instant t4A, the emission of the first circuit 31 finishes. The signal COEX_OUT is then switched to the low state by the first circuit 31. This means that the first circuit 31 no longer wishes to emit.

In a variant, only the inhibiting signal COEX_IN is transmitted from the second circuit 33 to the first circuit 31. This then makes it possible to use only the first conductor 360 of the connection 36 (FIG. 2). The number of conductors of the connection is thus reduced linking, preferably connecting, and the first circuit 31 to the second circuit 33. One also reduces the number of terminals of the circuits 31 and 33 dedicated to managing emission priorities between these two circuits.

In view B, the timing diagram illustrates another embodiment in which the priority is given to the emission of the field EMF1, that is to say, the near field emission by the first circuit 31. Contrary to the embodiment described in relation with view A, here it is the first circuit 31 that acts as the priority circuit. According to this embodiment, the signal COEX_OUT serves as inhibiting signal of the second circuit 33. In particular, the signal COEX_OUT here is configured to prevent a radiofrequency emission by the second circuit 33. The transmission of the signal COEX_IN here can be omitted.

According to the embodiment of view B, it is considered that the low state of the signal COEX_OUT indicates that the second circuit 33 is authorized to emit a radiofrequency signal. The high state of the signal COEX_OUT indicates that the second circuit 33 is prohibited from emitting a radiofrequency signal.

At an instant t0B, the signals RADIO, COEX_IN, COEX_OUT and NFC TX are idle. In particular, the signals NFC TX and RADIO are in a state such that they do not lead to any field emission by the antennas 32 and 34, respectively. The binary signal COEX_OUT is in a low state. According to this embodiment, this means that the second circuit 33 is allowed to emit.

At an instant t1B, after instant t0B, it is assumed that an emission control reaches the second circuit 33. At instant t1B, the signal COEX_OUT for inhibiting the second circuit 33 is in the low state. This means that the emission of the second circuit 33 is allowed. The second circuit 33 then begins the emission of the signal RADIO. During this time, the signal NFC TX is kept idle.

It is presumed that at an instant t2B, after instant t1B, the first circuit 31 wishes to communicate by near field. The first circuit 31 then switches the signal COEX_OUT to the high state. This interrupts the emission of the second circuit 33. The signal RADIO is then placed in the idle state.

At an instant t3B, after instant t2B, the first circuit 31 begins with a near field emission.

At an instant t4B, after instant t3B, the emission of the first circuit 31 ceases. The signal COEX_OUT is then switched to the low state.

In a variant, the signal CODEX_IN is also exchanged between the first circuit 31 and the second circuit 33. This then for example allows the first circuit 31 to determine the state of the circuit 33.

In view C, the timing diagram also illustrates another embodiment in which the emission of a circuit, among the circuits 31 and 33, is only possible after the other circuit has ceased to emit. In other words, it will arbitrarily be chosen to give priority to the circuit whose emission has already begun and has not yet finished.

Thus, according to the embodiment of view C the placement in the high state of the signal COEX_IN during the emission of the second circuit 33 makes it possible to inhibit the emission of the first circuit 31, and the placement in the high state of the signal COEX_OUT during the emission of the second circuit 33 makes it possible to indicate to the second circuit 33 that the first circuit 31 wishes to emit.

Similarly, still according to the embodiment of view C, the placement in the high state of the signal COEX_OUT during the emission of the first circuit 31 makes it possible to inhibit the emission of the second circuit 33, and that the placement in the high state of the signal COEX_IN during the emission of the first circuit 31 makes it possible to indicate to the first circuit 31 that the second circuit 33 wishes to emit.

At an instant t0C, the signals RADIO, COEX_IN, COEX_OUT and NFC TX are idle. In particular, the signals NFC TX and RADIO are in a state such that they do not lead to any field emission by the antennas 32 and 34, respectively. The binary signals COEX_IN and COEX_OUT are both in the low state. This indicates that neither the first circuit 31 nor the second circuit 33 wishes to emit.

At an instant t1C, after instant t0C, the second circuit 33 begins to emit.

At an instant t2C, after instant t1C, it is assumed that the first circuit 31 wishes to begin a near field emission. The signal COEX_OUT is then switched to the high state. This indicates that the first circuit 31 wishes to emit.

At an instant t3C, after instant t2C, the second circuit 33 switches the signal COEX_IN to the high state. This prohibits the emission of the first circuit 31. This prohibition is maintained as long as the emission of the second circuit 33 is not completed.

At an instant t4C, after instant t3C, the second circuit 33 ceases to emit. The second circuit 33 then switches the signal COEX_IN to the low state. This authorizes the emission of the first circuit 31.

At an instant t5C, after instant t4C, the signal COEX_OUT is still in the high state while the signal COEX_IN is in the low state. The first circuit 31 then begins to emit.

At an instant t6C, after instant t5C, the near field emission by the first circuit 31 finishes. The signal COEX_OUT is then switched to the low state.

Assuming that the second circuit 33 wished to emit between instants t5C and t6C, the second circuit would have switched the signal COEX_IN. The signal COEX_OUT being in the high state between instants t5C and t6C, the emission of the second circuit 33 would nevertheless have been prohibited until the emission of the first circuit 31 finishes, that is to say, until instant t6C where the signal COEX_OUT is switched to the low state.

The embodiments described above relative to FIGS. 3A-3C illustrate examples in which the signals COEX_IN and COEX_OUT make it possible to manage or arbitrate priorities between the near field emission by the first circuit 31 and the radiofrequency emission by the second circuit 33. These embodiments are nevertheless transposable to other situations in which one seeks to block the near field emission by the first circuit 31 while operations, for example refreshes of the screen 35, are done by the second circuit 33. This transposition is within the capabilities of those skilled in the art from the above description.

It is also possible to provide an embodiment in which one or more operations performed by the first circuit 31 block or inhibit one or several operations performed by the second circuit 33. Conversely, it is possible to provide another embodiment in which one or more operations performed by the second circuit 33 block or inhibit one or several operations performed by the first circuit 31. These combinations are within the capabilities of those skilled in the art from the present description.

What was described in relation with views A, B and C in reference to high and low states is transposable to inverse states (low and high).

Figure 4:
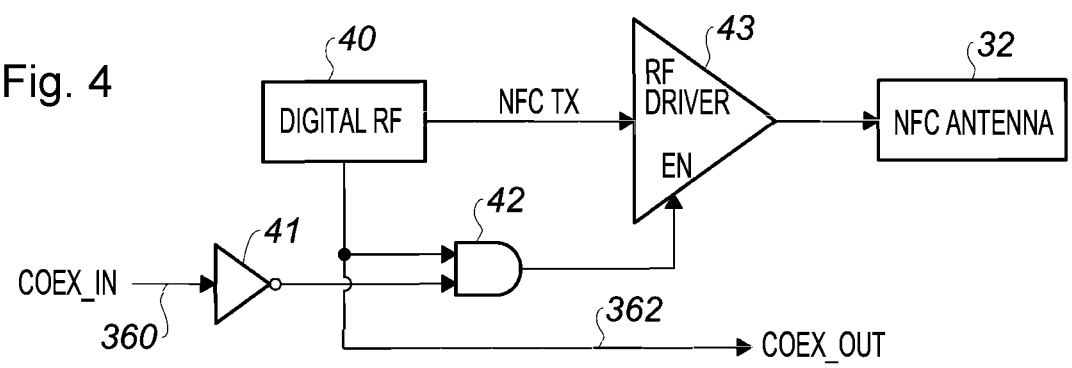
FIG. 4 schematically shows an embodiment of a control circuit of the device described in relation with FIG. 2.

FIG. 4 schematically shows an embodiment of a control circuit of the device described in relation with FIG. 2.

According to this embodiment, the second conductor 362 making it possible to transmit the signal COEX_OUT is linked, preferably connected, to an output of a radiofrequency communication circuit 40 (DIGITAL RF) of the NFC module. The first conductor 360, which transmits the signal COEX_IN from the second circuit 33, is linked, preferably connected, to an input of a first logic gate 41. The logic gate 41 is, as illustrated in FIG. 4, an inverter. The logic gate 41 thus makes it possible to obtain, at the output of the gate 41, a binary state signal or with inverse level relative to that of the binary signal COEX_IN at the input of the gate 41.

The output of the logic gate 41 is linked, preferably connected, to an input of a second logic gate 42. The logic gate 42 is, as illustrated in FIG. 4, an AND gate. The output of the circuit 40 is linked, preferably connected, to another input of the second logic gate 42. One thus obtains, at the output of the logic gate 42, a binary signal in the high state when the signal COEX_IN is in the low state and when the signal COEX_OUT is in the high state and a binary signal in the low state otherwise. The output of the logic gate 42 is linked, preferably connected, to an activation (enable) input (EN) of an amplifier 43 (RF DRIVER) of the radiofrequency signal NFC TX suitable for an antenna, for example the NFC ANTENNA 32 (NFC ANTENNA).

According to this embodiment, the signal COEX_IN is configured to prevent or block an NFC radiofrequency emission while the signal COEX_OUT is configured to communicate a request or emission control to the circuit 33 and to active, under the control of the signal COEX_IN, the NFC emission. One thus reproduces, in cabled logic using gates 41 and 42, an operation similar to that of the embodiment of the method previously described in relation with FIG. 3A.

In a variant, the signals COEX_IN and COEX_OUT are processed by software, for example by the circuit 40. The logic gates 41 and 42 are then for example programmed in the software (firmware) of the circuit 40. If applicable, the signal COEX_IN is transmitted directly to the circuit 40 and the input EN of the circuit 43 is controlled by an output of the circuit 40.

Figure 5:
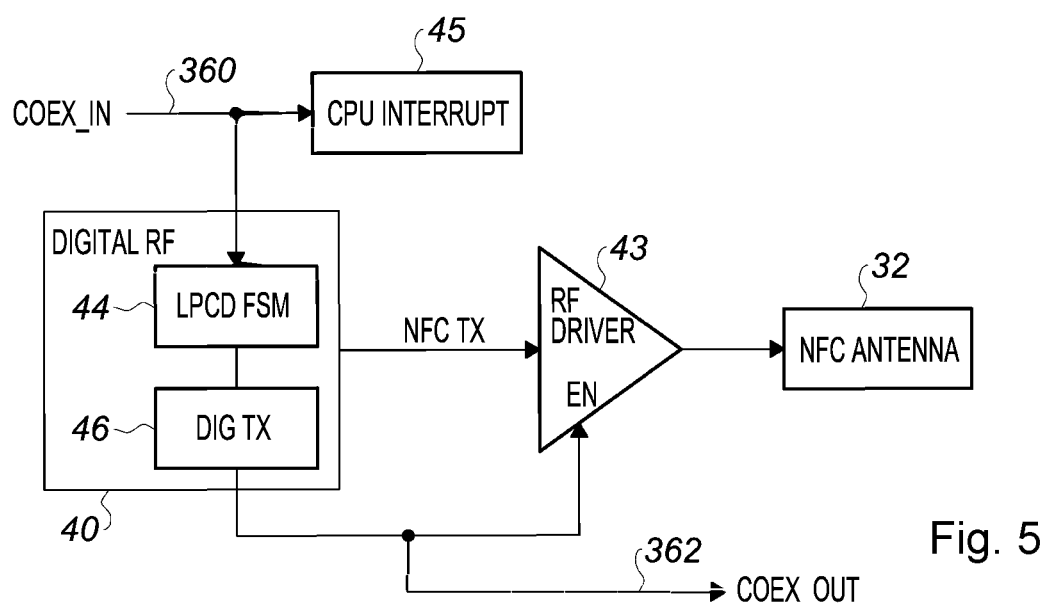
FIG. 5 schematically shows another embodiment of a control circuit of the device described in relation with FIG. 2.

FIG. 5 schematically shows another embodiment of a control circuit of the device described in relation with FIG. 2.

According to this embodiment, the first conductor 360, which transmits the signal COEX_IN from the second circuit 33, is linked, preferably connected, to an input of a first finite state machine 44 (LPCD FSM). The finite state machine 44 is for example part of the radiofrequency communication circuit 40 of the NFC module of the first circuit 31.

The signal COEX_IN is also transmitted to a processor or microcontroller of the first circuit 31. Switching to the high state of the signal COEX_IN causes an interruption (block 45, CPU INTERRUPT) of operations performed by this processor.

An output of the finite state machine 44 is linked, preferably connected, to an input of a circuit 46 (DIG TX), for example an NFC modem. The circuit 46 is for example part of the radiofrequency communication circuit 40 (DIGITAL RF) of the NFC module, as illustrated in FIG. 5. The circuit 46 is for example a circuit dedicated to the field emission (NFC TX). The circuit 46 can in particular control an emission power, an output impedance, etc. An output of the circuit 46 is linked, preferably connected, to the conductor 362 making it possible to transmit the signal COEX_OUT to the second circuit 33. The output of the circuit 46 is linked, preferably connected, to an activation (enable) input (EN) of an amplifier 43 (RF DRIVER) of the radiofrequency signal NFC TX suitable for an antenna, for example the NFC ANTENNA 32 (NFC ANTENNA). The circuit 46 can correspond to a digital part of the amplifier 43.

Similarly to the embodiment described in relation with FIG. 4, the signal COEX_IN is configured to prevent or block an NFC radiofrequency emission while the signal COEX_OUT is configured to communicate a request or emission control to the circuit 33 and to active, under the control of the signal COEX_IN, the NFC emission. One thus reproduces, in cabled logic using the finite state machine 44 of the first circuit 31, an operation similar to that of the embodiment of the method previously described in relation with FIG. 3A.

Figure 6:
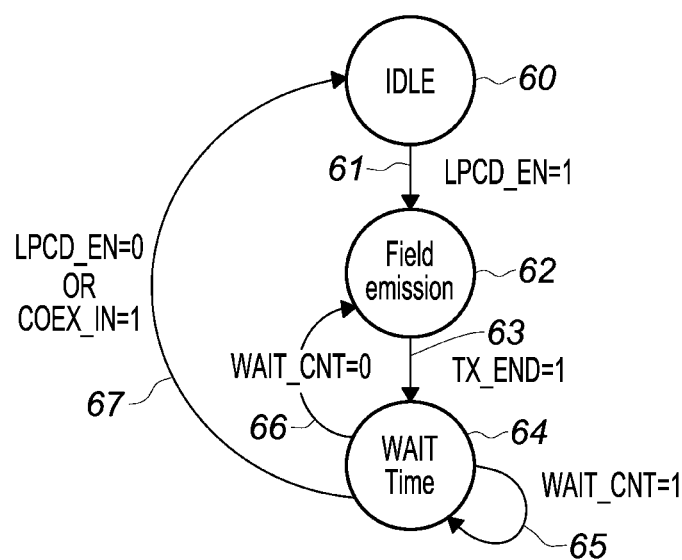
FIG. 6 is a sequence diagram of steps of an embodiment of a method for controlling the circuit described in relation with FIG. 5.

FIG. 6 is a sequence diagram of steps of an embodiment of a method for controlling the circuit described in relation with FIG. 5.

According to this embodiment, the first NFC emission circuit 31 is initially in an idle state (block 60, IDLE). When the first circuit 31 wishes to emit in near field, the finite state machine 44 (FIG. 5) activates (arrow 61, LPCD_EN=1) the amplifier 43 by its input EN. This thus makes it possible to authorize the near field emission of the signal NFC TX by the antenna 32. The first circuit 31 is then in a near field emission state (block 62, Field emission).

Once the near field emission is complete, the first circuit 31 enters (arrow 63, TX_END=1) a waiting state (block 64, WAIT Time). A time delay is then launched suitable for temporarily keeping the first circuit 31 in the waiting state 64, that is to say, during a duration denoted CNT. The first circuit 31 is meant to stay in the waiting state 64 as long as the duration CNT has not elapsed (arrow 54, WAIT_CNT=1). The first circuit 31 then returns to the emission state 62 once the duration CNT has elapsed (arrow 66, WAIT_CNT=0).

The first circuit 31 can further leave the waiting state 64 and return (arrow 67, LPCD_EN=0 OR COEX_IN=1) to the idle state 60 before the duration CNT has elapsed. This for example occurs if the finite state machine 44 deactivates the input EN of the amplifier 43 or if the signal COEX_IN is switched to the high state by the second circuit 33.

According to this embodiment, the second circuit 33 takes priority relative to the first circuit 31. The first circuit 31 here is authorized to emit in near field under control of the signal COEX_IN transmitted by the second circuit 33. The near field emission 62 finishes, however, only at the initiative of the first circuit 31, the signal COEX_IN here only being taken into account in the waiting state 64. In this case, the finite state machine activates the amplifier 43 with the additional condition that the signal COEX_IN is in the low state.

The first circuit 31 here is configured so that the emission of the field 62 is done by periodic bursts, intercut by waiting phases 64. This operating mode of the circuit 31 is described as low power card detection (LPCD).

According to one preferred embodiment, in this low consumption mode, each near field emission 62 of the first circuit 31 is done by bursts with a duration of about 30 µs. This emission is repeated about three to four times per second, the duration CNT, corresponding to an interval between bursts, therefore being between about 250 ms and about 330 ms.

Figure 7A:
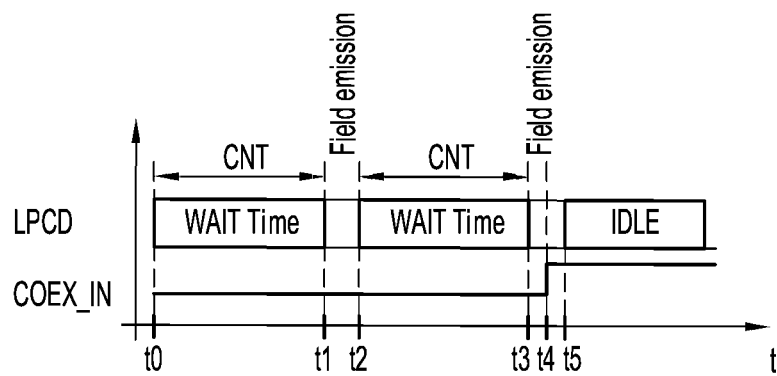
FIGS. 7A and 7B, collectively
Figure 7B:
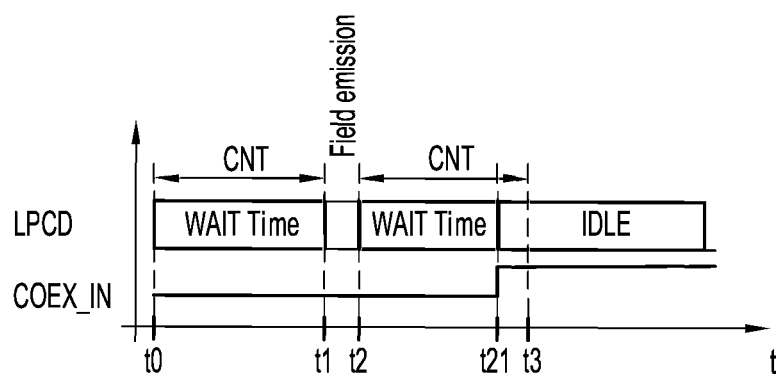

FIGS. 7A and 7B show timing diagrams of the control method described in relation with FIG. 6. These timing diagrams in particular reflect evolution examples, as a function of time (t), of the signal COEX_IN and the state of the first circuit 31, denoted LPCD.

In view A, the timing diagram illustrates an exemplary evolution according to which the switching of the signal COEX_IN to the high state takes place during the near field emission of the first circuit 31.

At an instant t0, it is assumed that the first circuit 31 enters the waiting state (WAIT Time), while the signal COEX_IN is in the low state.

At an instant t1, after instant t0 and separated from instant t0 by the duration CNT, the signal COEX_IN is still in the low state. The first circuit 31 therefore enters the near field emission state (Field emission).

At an instant t2, after instant t1, the near field emission burst by the first circuit finishes. The signal COEX_IN still being in the low state, the first circuit 31 is returned to the waiting state (WAIT Time).

At an instant t3, after instant t2 and separated from instant t2 by the duration CNT, the signal COEX_IN is still in the low state. The first circuit 31 therefore again enters the near field emission state (Field emission).

At an instant t4, after instant t3, the signal COEX_IN is switched to the high state by the second circuit 33 during the near field emission by the first circuit 31. According to this embodiment, the switching of the signal COEX_IN does not interrupt the near field emission.

At an instant t5, after instant t4, the near field emission by the first circuit 31 finishes. The signal COEX_IN being in the high state, the first circuit 31 is prohibited from emitting again. The first circuit 31 is then placed in the idle state (IDLE).

In view B, the timing diagram illustrates an exemplary evolution according to which the switching of the signal COEX_IN to the high state takes place outside the near field emission of the first circuit 31.

Between instants t0 and t2, the timing diagram of view B is similar to the timing diagram of view A.

At an instant t21, after instant t2 and separated from instant t2 by a duration shorter than the duration CNT, the signal COEX_IN is switched to the high state by the second circuit 33. In view B, the first circuit 31 is thus in the waiting state (WAIT Time) at the instant of the switching of the signal COEX_IN. The first circuit 31 is then placed in the idle state (IDLE) at instant t21 without waiting for the expiration of the duration CNT provided at instant t3, after instant t21.

One advantage of the embodiment described in relation with FIGS. 6 and 7 lies in the fact that the emission of the first circuit 31 is not interrupted abruptly by the second circuit 33. One thus avoids disturbing the operation of the first circuit 31, in particular when this first circuit 31 is configured in low power card detection mode.

In the case of a near field emission in a so-called normal mode, in other words, a mode in which the near field emission is done continuously, one generally needs to be able to interrupt the emission in a maximum period of about 300 µs to 400 µs following the demand of a priority circuit. The embodiment described in relation with FIGS. 6 and 7 is advantageously compatible with this need, even allowing a burst to finish. Indeed, the near field emission of the first circuit 31 finishes after a duration on the order of 30 µs.

Furthermore, a hardware embodiment (with cabled logic) is preferred for speed reasons relative to a software implementation.

Figure 8:
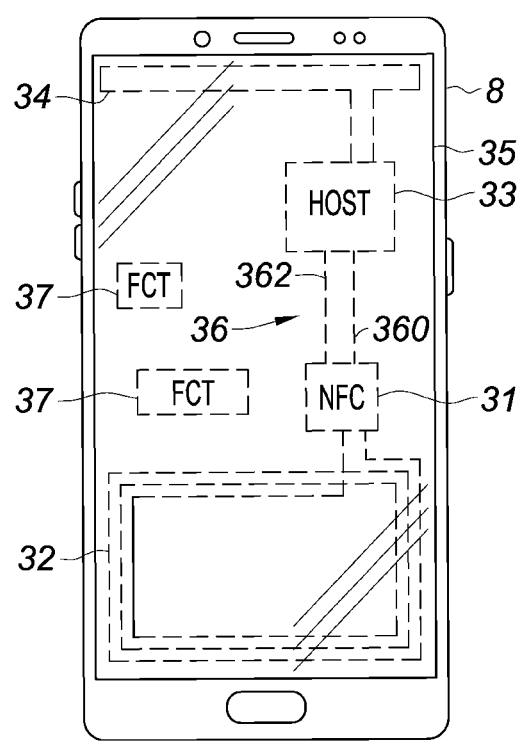
FIG. 8 shows, very schematically and in block diagram form, an example implementation of the circuits of FIG. 2 in a mobile telephone.

FIG. 8 shows, very schematically and in block diagram form, an example implementation of the circuits of FIG. 2 in a mobile telephone 8. In the example of FIG. 8, the mobile telephone 8 includes elements similar to those of the device 1 of FIG. 2 (in FIG. 8, these elements are shown in dotted lines).

The mobile telephone 8 in particular includes the first NFC circuit 31 connected to the antenna 32 and the second circuit 33 connected to the antenna 34. The circuits 31 and 33 are linked, preferably connected, by the connection 36. This allows the telephone 8 to manage priorities between operations performed by the first circuit 31 and other operations performed by the second circuit 33. For example, the near field emission by the antenna 32 can be inhibited upon each refresh of the primary screen 35 of the telephone 8.

Various embodiments and variants have been described. Those skilled in the art will understand that certain features of these embodiments can be combined and other variants will readily occur to those skilled in the art. In particular, what is described more particularly in relation with one exemplary application to priority management between a near field emission and a radiofrequency emission and/or a screen refresh applies more generally to an inhibition of one or several functionalities of one circuit by another circuit owing to a dedicated connection.

Finally, the practical implementation of the embodiments and variants described herein is within the capabilities of those skilled in the art based on the functional description provided hereinabove. In particular, the implantation of the connection 36 in the mobile telephone 8 is within the capabilities of one skilled in the art.

What is claimed is:

1. A method of operating a unitary device comprising a first circuit and a second circuit, the method comprising:
    communicating a first signal to the first circuit by the second circuit, the first signal indicating to the first circuit that the first circuit is prohibited from emitting a near field emission; and
    communicating a second signal to the second circuit by the first circuit, the second signal indicating to the second circuit a near field emission request by the first circuit,
    wherein the communicating the first signal and the second signal between the first circuit and the second circuit comprises communicating between a hardware connection connecting, and exclusively dedicated to priority management between, the first circuit to the second circuit.

2. The method of claim 1, wherein a communication transmitted by the near field emission is a near field communication (NFC).

3. The method of claim 1, wherein the unitary device prioritizes an emission by the second circuit over the first circuit.

4. The method of claim 1, further comprising emitting a near field emission by the first circuit based on the first signal and the second signal.

5. The method of claim 1, further comprising prohibiting a near field emission by the first circuit based on the first signal and the second signal.

6. The method of claim 1, further comprising emitting a radiofrequency emission by the second circuit based on the first signal and the second signal.

7. The method of claim 1, wherein the first signal and the second signal are binary signals, and wherein the first circuit is permitted to emit a near field emission in response to logic levels of the first signal and the second signal indicating that the first circuit is permitted to emit the near field emission.

8. A method of operating a unitary device comprising a first circuit and a second circuit, the method comprising:
communicating a signal to the second circuit by the first circuit, the signal indicating to the second circuit that the second circuit is prohibited from emitting a radiofrequency emission, wherein the communicating the signal between the first circuit and the second circuit comprises communicating between a hardware connection connecting, and exclusively dedicated to priority management between, the first circuit to the second circuit.

9. The method of claim 8, further comprising emitting a near field emission by the first circuit during a time that the second circuit is prohibited from emitting the radiofrequency emission.

10. The method of claim 8, wherein the unitary device prioritizes an emission by the first circuit over the second circuit.

11. The method of claim 8, further comprising emitting a radiofrequency emission by the second circuit based on the signal.

12. The method of claim 8, further comprising prohibiting a radiofrequency emission by the second circuit based on the signal.

13. The method of claim 8, further comprising emitting a near field emission by the first circuit based on the signal.

14. The method of claim 8, wherein the signal is a binary signal, and wherein the second circuit is permitted to emit a radiofrequency emission in response to a logic level of the signal indicating that the second circuit is permitted to emit the radiofrequency emission.

15. A method of operating a unitary device comprising a first circuit and a second circuit, the method comprising:
communicating a first signal to the first circuit by the second circuit, the first signal indicating to the first circuit that the first circuit is prohibited from emitting a near field emission during a radiofrequency emission by the second circuit; and
communicating a second signal to the second circuit by the first circuit, the second signal indicating to the second circuit that the second circuit is prohibited from emitting a radiofrequency emission during a near field emission by the first circuit,
wherein the communicating the first signal and the second signal between the first circuit and the second circuit comprises communicating between a hardware connection connecting, and exclusively dedicated to priority management between, the first circuit to the second circuit.

16. The method of claim 15, wherein a communication transmitted by the near field emission is a near field communication (NFC).

17. The method of claim 15, further comprising prohibiting a near field emission by the first circuit based on the first signal during a radiofrequency emission by the second circuit.

18. The method of claim 15, further comprising prohibiting a radiofrequency emission by the second circuit based on the second signal during a near field emission by the first circuit.

19. The method of claim 15, wherein the first signal is a binary signal, and wherein the first circuit is prohibited from emitting a near field emission in response to a logic level of the first signal during a radiofrequency emission by the second circuit.

20. The method of claim 15, wherein the second signal is a binary signal, and wherein the second circuit is prohibited from emitting a radiofrequency emission in response to a logic level of the second signal during a near field emission by the first circuit.

* * * * *